United States Patent [19]

Sandham

[11] 4,238,135
[45] Dec. 9, 1980

[54] SEAT BELT KIT FOR A PEDESTAL SEAT BASE
[75] Inventor: Edwin C. Sandham, Thiensville, Wis.
[73] Assignee: Leggett & Platt, Inc., Carthage, Mo.
[21] Appl. No.: 53,752
[22] Filed: Jul. 2, 1979
[51] Int. Cl.³ .................... A62B 35/00; A47C 31/00
[52] U.S. Cl. ................................. 297/468; 297/216; 297/349
[58] Field of Search ............... 297/468, 483, 216, 349, 297/464; 248/415; 280/801, 808; 296/65 R

[56] References Cited
U.S. PATENT DOCUMENTS

| 3,328,080 | 6/1967 | Dall | 297/468 |
|---|---|---|---|
| 3,338,622 | 8/1967 | Bachmann | 297/349 X |
| 3,845,987 | 11/1974 | Bashford | 297/216 X |
| 4,062,588 | 12/1977 | Draney | 297/468 |
| 4,120,531 | 10/1978 | Fefferman | 297/349 |

Primary Examiner—James T. McCall
Attorney, Agent, or Firm—Wood, Herron & Evans

[57] ABSTRACT

A seat belt kit for a pedestal seat base of the type in which the base's seat support and pedestal are connected together in swivel relation. In preferred form, the seat belt kit includes a tubular connector bar structured to be received on rearwardly and downwardly facing bar seats formed integral with the base's seat support. The tubular bar is held in fixed relation with the base's seat support only by bolts which extend from interiorly of the seat support into tapped bores in the bar's sidewall so that the bolts are not exposed. The seat belt is connected to each end of the tubular bar, on either side of the seat, by bolts threaded axially into the bar.

10 Claims, 4 Drawing Figures

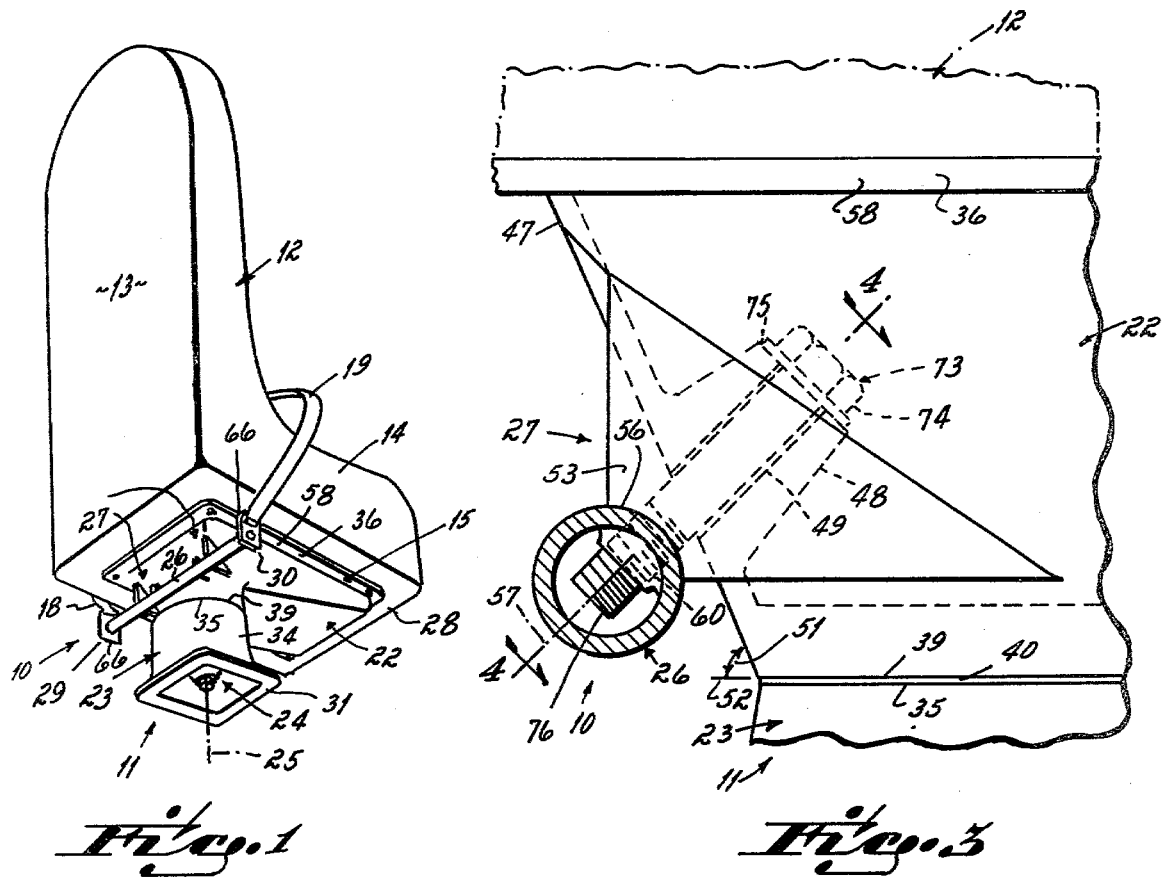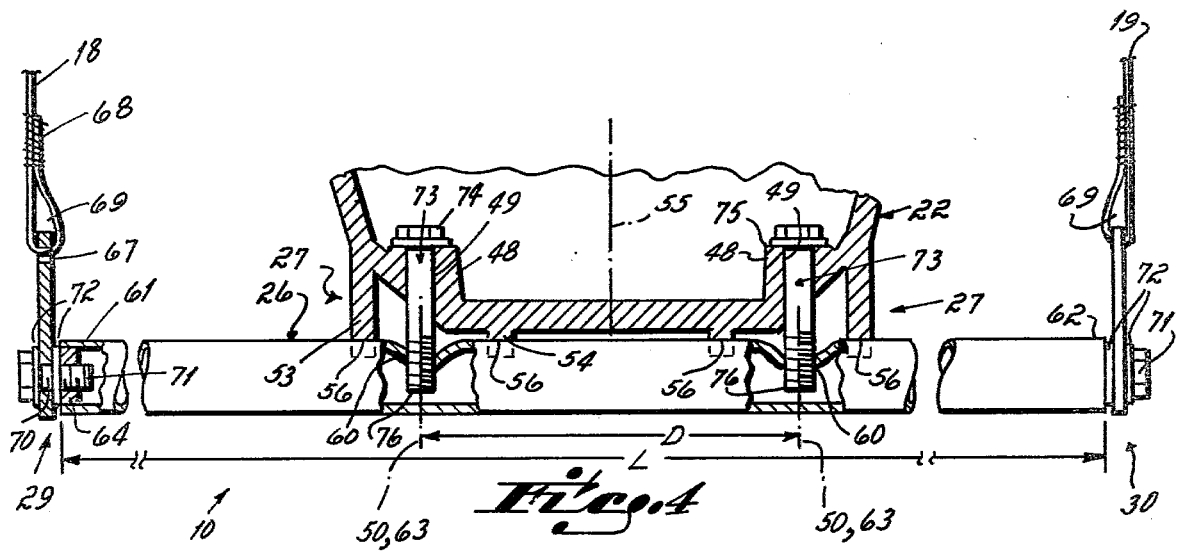

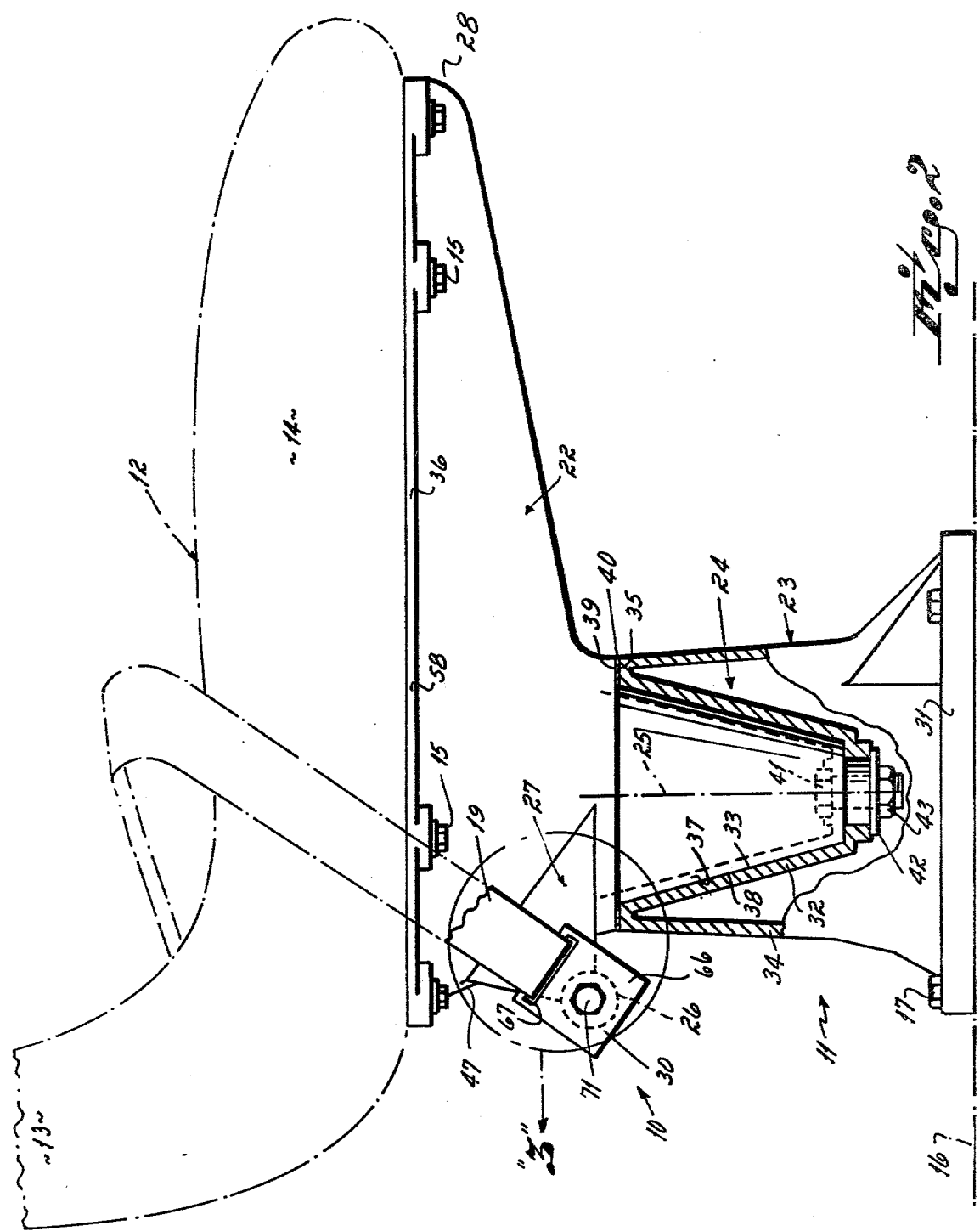

SEAT BELT KIT FOR A PEDESTAL SEAT BASE

This invention relates to seat bases. More particularly, this invention relates to a seat belt kit for a pedestal seat base.

Pedestal seat bases are, of course, very well known to the art. Swivel type pedestal seat bases have been commonly used in the past in delivery vehicles, e.g., trucks and vans. Recently, however, swivel type pedestal seat bases also have been used in recreational vehicles, e.g., campers and the like. The primary function of a pedestal seat base is, of course, to permit the seat to swing or rotate relative to the vertical axis of the pedestal base when desired by the user. Such rotation is desirable, in a vehicle environment, for providing ingress to and egress from the seat by the vehicle's driver relative to the control panel and controls of the vehicle. In other words, the swinging motion of the seat allows the driver to enter into and exit from the seat with the seat swinging to a position 90° or more removed from the seat's front facing or normal driving position. It is also known to provide a seat belt in combination with a pedestal seat base. The seat belt, of course, functions to restrain the seat's user in the seat in the unhoped for event of an accident. The seat belt, as is commonly known, may be locked and unlocked as desired when the user wishes to get into the seat or get out of the seat, i.e., enter or leave the vehicle. One particular seat belt arrangement for a pedestal seat base, as known to the prior art, is disclosed in U.S. Pat. No. 4,120,531. This patent has been recently issued, and discloses a pedestal seat base structure which incorporates a seat belt arrangement that is, according to the patent, particularly adapted for use in a vehicle environment.

It has been one objective of this invention to provide a pedestal seat base incorporating, in novel combination, a seat belt attachment structure which has a long useful life, i.e., a high resistance to failure, during use of that structure in its intended environment.

It has been another objective of this invention to provide a novel seat belt kit which may be easily and simply installed by an owner on an earlier conformed pedestal base.

In accord with these objectives, the seat belt kit of this invention is for a swivel type seat in which the base's seat support and pedestal are connected together in swivel relation. In preferred form, the seat belt kit includes a tubular connector bar structured to be received on rearwardly and forwardly facing bar seats formed integral with the base's seat support. The tubular bar is held in fixed relation with the base's seat support only by bolts which extend from interiorly of the seat support into tapped bores in the bar's sidewall so that the bolts are not exposed. The seat belt is connected to each end of the tubular bar, on either side of the seat, by bolts threaded axially into the bar.

Other objectives and advantages of this invention will be more apparent from the following detailed description taken in conjunction with the drawings in which:

FIG. 1 is a perspective view illustrating a pedestal seat base, in combination with a seat belt kit, in accord with the principles of this invention;

FIG. 2 is a cross-sectional view taken along line 2—2 of FIG. 1;

FIG. 3 is an enlarged view of the encircled portion shown in FIG. 2; and

FIG. 4 is a cross-sectional view taken along line 4—4 of FIG. 3.

The seat belt kit 10 of this invention, in combination with a pedestal seat base 11, is shown generally in FIG. 1. The seat belt kit 10 and base 11 are adapted for use with a seat 12 having a backrest 13 and a seat 14, the seat 12 per se forming no part of this invention. The seat 12 is mounted to the pedestal base 11 by bolts 15. The pedestal seat base 11 itself is adapted for mounting on the floor 16 of a vehicle, e.g., van or recreational vehicle, by means of bolts 17 for the purpose of positively locating and positioning the pedestal seat base (and, hence, the seat 12) in desired position relative to the control panel (not shown) and controls (not shown) of that vehicle. The seat belt kit 10 is directly connected with the specially conformed pedestal seat base 11 so as to provide the seat's user with a lockable seat belt 18, 19.

The pedestal seat base 11 includes a seat support 22 and a pedestal 23, the seat support and pedestal being connected one with another through a vertical thrust bearing 24, see FIGS. 1 and 2. The vertical thrust bearing 24, of course, allows the seat 12 to swivel or rotate relative to the center axis 25 of the pedestal (which axis also is the axis of the vertical thrust bearing). The seat belt kit 10 includes a linear tubular bar 26 attached on rearwardly and downwardly facing seats 27 to the base's seat support 22 rearwardly of the base's center axis 25, relative to front edge 28 of the seat 12. The tubular bar 26 is connected at each end to one section 18, 19 of a seat belt as at 29, 30, the seat belt sections being connectable at the other end by any suitable latch (not shown) positioned in the lap of the seat's user.

The pedestal 23 is preferably fabricated as a one-piece casting, e.g., of aluminum, and includes a baseplate 31 connectable to a floor 16 by bolts 17, see FIG. 2. The vertical thrust bearing 24 includes an outer bearing collar 32 formed integral with the pedestal 23. The outer bearing collar 32 is of an inverted frusto-conical configuration, and provides the fixed bearing surface 33 for the vertical thrust bearing. The outer bearing collar 32 is disposed with a generally tubular post 34, and is connected with the baseplate 31 through that post. The joinder of the outer bearing collar 32 with the support post 34 provides a flat bearing surface 35 along the top edge thereof.

The seat support 22 is also of a one-piece configuration, and may be cast of, for example, aluminum, too, see FIG. 2. The seat support 22 is fixed to the seat 11 by bolts 15 through baseplate 36. The seat support 22 also mounts or carries a part of the vertical thrust bearing 24. That portion of the vertical thrust bearing 24 carried by the seat support is also of inverted frusto-conical configuration, and is an inner bearing collar 37 sized and configured to mate with the pedestal's outer bearing collar 32. The inner bearing collar 37 presents a rotatable bearing surface 38 that is rotatable within and relative to the outer bearing surface 33. The inner bearing collar 37, which is formed integral with and extends downwardly from the seat support 22, terminates at its large diameter end in a flat bearing surface or lip 39 adapted to overlie the flat bearing lip 35 formed on the pedestal 23. A bearing washer 40 of, e.g., steel, is interposed between the seat support's flat bearing lip 39 and the pedestal's flatted bearing lip 35 in assembly. The seat support 22 and the pedestal 23 are retained in operational configuration, i.e., held together against vertical separation, by bolt 41 at the minor diameter ends of the inner 37 and outer 32 bearing collars. The bolt 41 cooperates with washer 42 and nut 43, as shown in FIG. 2, to restrain the vertical thrust bearing 24 in operational assembly and, thereby, to connect the seat 12 and pedestal seat base 11 in operational assembly.

The seat support 22 is also specially conformed to mount the seat belt kit 10. In this regard, the seat support 22 is specially configured adjacent the rear wall 47 thereof as shown in FIGS. 3 and 4. Two spaced bosses 48 are formed interiorly of the seat support 22 on opposite sides of the rear wall 47 and integral with the seat support casting. The bosses 48 define bores 49 the axes 50 of which are parallel one to another, and the purpose of which is explained hereinafter. Note particularly the seat support's rear wall 47 is angled to establish an acute angle 51 between itself and the base's swivel plane 52 (which is normal to the base's swivel axis 25) when the base is viewed from the side, the arcuate angle 51 opening rearwardly relative to the seat's front edge 28, see FIGS. 1 and 3. A series of rearwardly and downwardly facing bar seats 27, relative to the seat 11 and the seat's front edge 28, are also provided on the seat support 22 adjacent or on its rear wall 47. The bar seats 27 are formed by ears 53, 54 cast integral with the seat support 22 on the exterior surface thereof. These ears 53, 54, one of each pair being provided on each of the outboard and inboard boss axis 50, are oriented generally parallel to the center symmetry plane 55 of the base as shown in FIG. 4. Note particularly that each ear 53, 54 is provided with an arcuate or curvalinear seat 56, the function of which is described in detail below. The arcuate seats 56 are all provided with arcs of identical diameter, and are oriented so that an arc diameter 57 line overlies the bore axis 50 of the adjacent boss 48 when the pedestal seat base 10 is viewed from the side as shown in FIG. 3.

It is contemplated that the seat belt kit 10 may be manufactured and sold in combination with the pedestal seat base 11, or may be manufactured and sold separate from the pedestal seat base 11. In the latter situation, the owner of a conformed pedestal seat base 11 (as described above) would assemble the seat belt kit 10 with the base's seat support 22. The seat belt kit 10 itself basically includes the linear tubular bar 26, which is cylindrical as shown for cooperation with arcuate seats 56, and which is of a length L greater than the distance D between the outermost connection locations 58 with the seat support 22. The cylindrical bar 26 is structurally rigid, and in its sidewall 57 includes tapped bores 60 midway and symmetrically disposed between the ends 61, 62 thereof. The axes 63 of the tapped bore 60 are parallel one to another, and are positioned diametrically through the bar 26. A threaded nut 64 is mounted in each end 61, 62 of the tubular bar 26, the nut being affixed thereto as by welds.

The seat belt kit 10 also includes seat belt straps 18, 19, each strap being provided with a connector plate 66 in the usual fashion. Each seat belt strap 18, 19 is threaded through slot 67 in the connector plate 66, and is sewn as at 68 back on itself so as to provide a looped connection as at 69. Each seat belt strap's connector plate 66 is also provided with a bore 70 that permits the connector plate to be fixed to one end 29 or 30 of the seat belt bar 26. Each seat belt strap 18, 19 is connected to one end 29 or 30 of the bar 26 by a strap bolt 71 with washers 72 being positioned on either side of the connector plate 66, as shown in FIG. 4. When the strap bolts 71 are tightened in immobile nuts 64, the connector plates 66 are held in fixed relation with the seat belt bar 26 so that same are immobile relative thereto.

In assembly of the connector bar 26 with the pedestal base 11, and before the seat 12 is bolted by bolts 15 to the seat support 22, the bar is initially positioned up against the curvalinear seats 56 defined by the seat support's exterior ears 53, 54 so that the bar's tapped axes 63 are aligned with the seat support's boss axes 50, see FIG. 4. Bar bolts 73 are then inserted through the bosses 48 and threadedly engaged with threaded bores 60 in the tubular bar 26, as shown in FIGS. 3 and 4, until the bar 26 is finally positioned on seats 56. Because the bar 26 is oriented with the axes 63 of its tapped or threaded bores 60 coaxial with the axes 50 of the seat support's bosses 48, and because the length of the bar bolts 73 is such that once the bolt's heads 74 are seated against the lips 75 of the bosses 48 and threaded into the tapped bores of the cross bar, the threaded ends 76 of the bar bolts 73 are positioned interiorly of the connector bar, see FIGS. 3 and 4. This structural relation hides the bolt ends 76 from view, which is desirable aesthetically, but also is desirable in that it prevents a user's clothes from being snagged thereon. Thereafter, the seat 12 is reinstalled or bolted to the seat support 22 by bolts 15. Thus, the seat belt connector bar 26 is firmly attached to the seat support 22 by a pair of bolts 73 which are inaccessible from the exterior of the pedestal seat base 11 because the bolts head 74 ends are disposed interiorly of the seat support 22 and the bolts' threaded ends 76 are disposed interiorly of the connector bar 26, all as shown in FIGS. 3 and 4. Thus, the swivel type seat 12 is made ready for use.

In use, because of the orientation of the connector bar rearwardly of the seat support's rear wall 47, because of the rearward facing angle of that rear wall when the seat is viewed from the side as shown in FIG. 3, and because of the rearwardly and downwardly facing seats 56, in the unhoped for event of an accident the user's force exerted on the seat belt straps 18, 19 tends to draw the connector bar 26 even tighter against the seats 56 and, hence, the seat support's rear wall 47, thereby insuring that no failure of the seat belt 18, 19 equipment will occur due to its inter-connection with the seat support. In other words, the downwardly and rearwardly facing seats 56 cooperate with the connector bar 26 to prevent upward and forward motion of that bar in the event of an accident. Further, and because the seat support 22 is pivotally connected to the pedestal 23 by the vertical thrust bearing 24, and since the pedestal 23 is firmly connected to a floor 16 by bolts 17, an interconnection is provided between the seat belt 18, 19 and that floor 16.

Having described in detail the preferred embodiment of my invention, what I desire to claim and protect by Letters Patent is:

1. A pedestal seat base for a seat, said base comprising
  a pedestal and a seat support, said seat support being pivotable relative to said pedestal, and said seat support having a rear wall,
  at least one bar seat formed integral on said seat support's rear wall, said bar seat facing downwardly and rearwardly relative to the front edge of said seat,
  a connector bar received in seated relation on said seat, said connector bar being prevented from upward and forward motion due to its seated relation on said rearwardly and downwardly facing seat, strap means for connecting two seat belt straps to said connector bar at spaced locations one from the other, and bolt means connecting said connector bar to said seat support, said connector bar being easily connected to said seat support only by said bolt means after being positioned against said bar seat, and said bar seat cooperating with said connector bar to prevent upward and forward motion of said connector bar relative to said seat support.

2. A pedestal seat base as set forth in claim 1, said connector bar being of tubular configuration, and said connector bar including at least one tapped bore in the sidewall thereof, and said bolt means comprising at least one bolt for connecting said connector bar to said seat support, the threaded end of said bolt being receivable in said connector bar's tapped bore for connecting said bar to said seat support.

3. A pedestal seat base as set forth in claim 2, said seat support defining a bore therethrough having a bolt axis which, when viewed from the side, overlies the bore axis defined in said tubular bore, and said bolt means comprising a bolt the head end of which bears against the interior surface of said seat support and the threaded end of which is received within said connector bar, thereby removing said belt from accessibility during use of said pedestal seat base.

4. A pedestal seat base as set forth in claim 3, said seat being curvalinear, and said connector bar being cylindrical, the radius of said seat and the outside radius of said connector bar being substantially identical, and a diameter of said connector bar overlying the bolt axis of said connector bar's bore.

5. A pedestal seat base as set forth in claim 4, said seat support comprising a rear wall that, when said seat is viewed from the side, defines a rearwardly directed acute angle with a phantom plane disposed normal to the swivel axis of said pedestal seat base at the joinder of said seat support and said pedestal.

6. A seat belt kit for a pedestal seat base, said base including a seat support having a rear wall, and a pedestal, said seat support being pivotable relative to said pedestal, said kit comprising a connector bar of tubular configuration, said tubular bar being adapted to seat against a rear wall of said seat support, and said connector bar including at least one tapped bore in the sidewall thereof, at least one bolt for connecting said connector bar to said seat support, the threaded end of said bolt being receivable in said connector bar's tapped bore for connecting said bar to said seat support, and seat belt connector means for connecting two seat belt straps to said connector bar.

7. A seat belt kit as set forth in claim 6, said seat support defining a bore therethrough having a bolt axis which, when viewed from the side, overlies the bore axis defined in said tubular bore, and said bolt comprising a bolt the head end of which is adapted to bear against the interior surface of said seat support and the threaded end of which is received within said connector bar, thereby removing said bolt from accessibility during use of said pedestal seat base.

8. A seat belt kit as set forth in claim 7, said seat support defining at least one seat on said rear wall which faces downwardly and rearwardly relative to the front edge of said seat support, and said connector bar being received in seated relation on said seat, said connector bar being prevented from upward and forward motion due to its seated relation on said rearwardly and downwardly facing seat.

9. A pedestal seat belt kit as set forth in claim 8, said seat being curvalinear, and said connector bar being cylindrical, the radius of said seat and the outside radius of said connector bar being substantially identical, a diameter of said connector bar being adapted to overlie the bolt axis of said connector bar's bore.

10. A seat belt kit as set forth in claim 9, said seat support comprising a rear wall that, when said seat is viewed from the side, defines a rearwardly directed acute angle with a phantom plane disposed normal to the swivel axis of said pedestal seat base at the joinder of said seat support and said pedestal.

* * * * *